Figure 6:
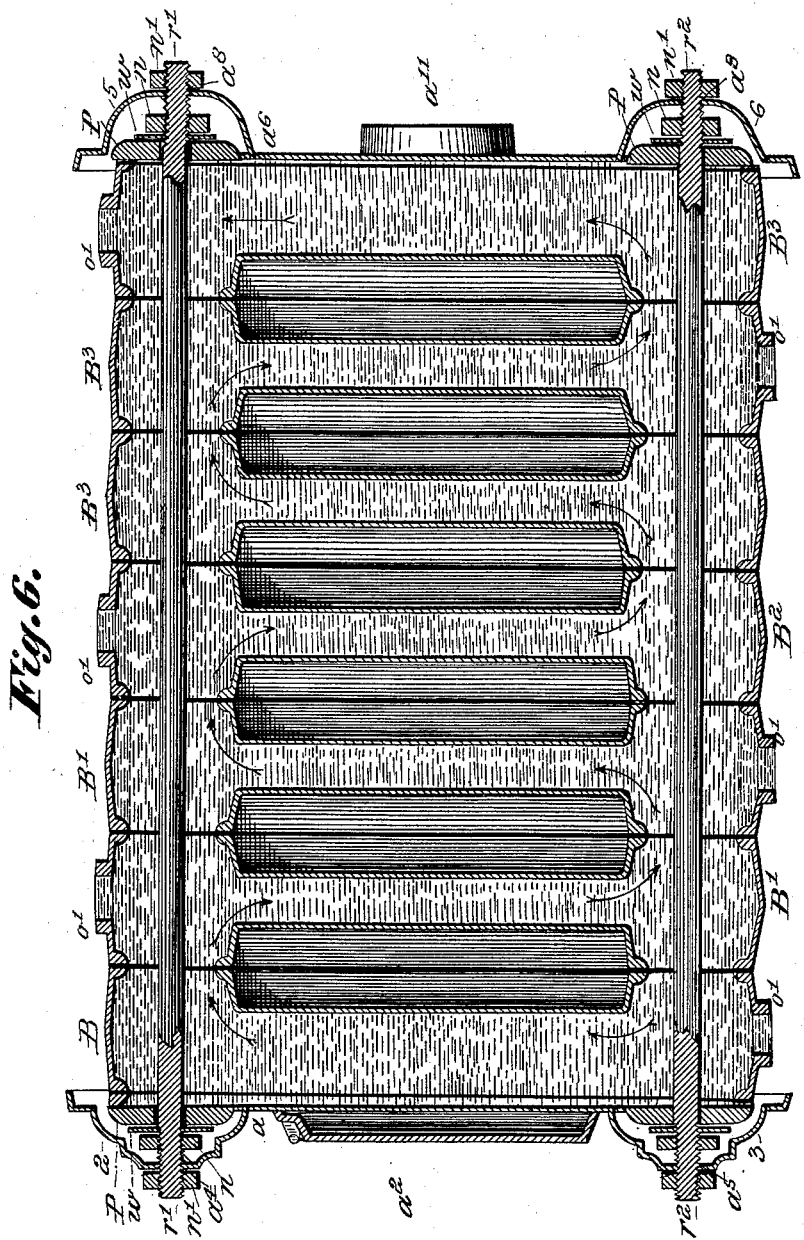

(No Model.)   5 Sheets—Sheet 1.
N. A. BOYNTON.
HOT WATER HEATING APPARATUS.
No. 396,802.   Patented Jan. 29, 1889.
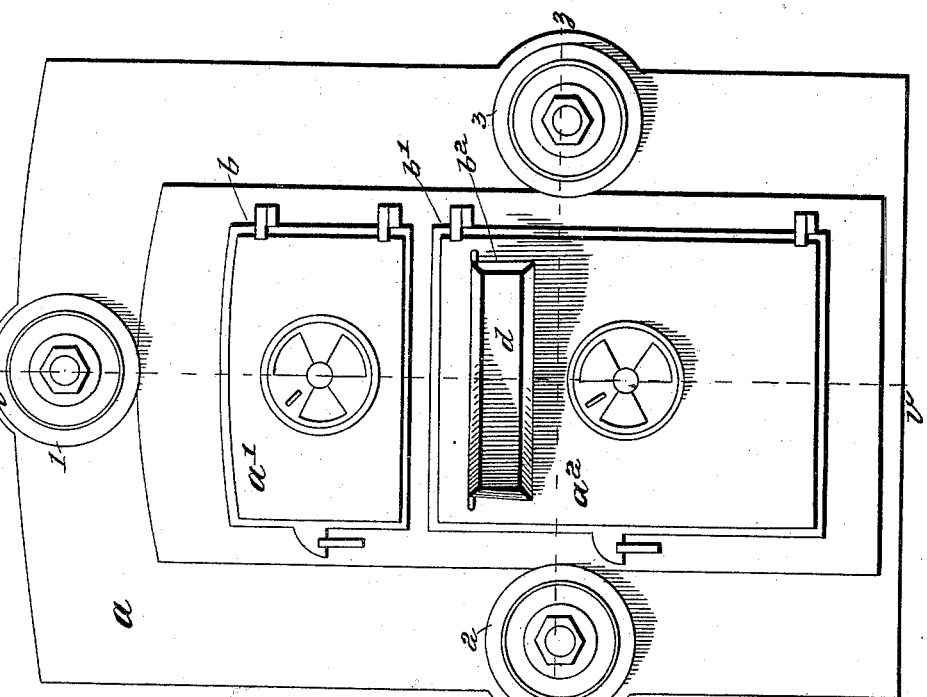
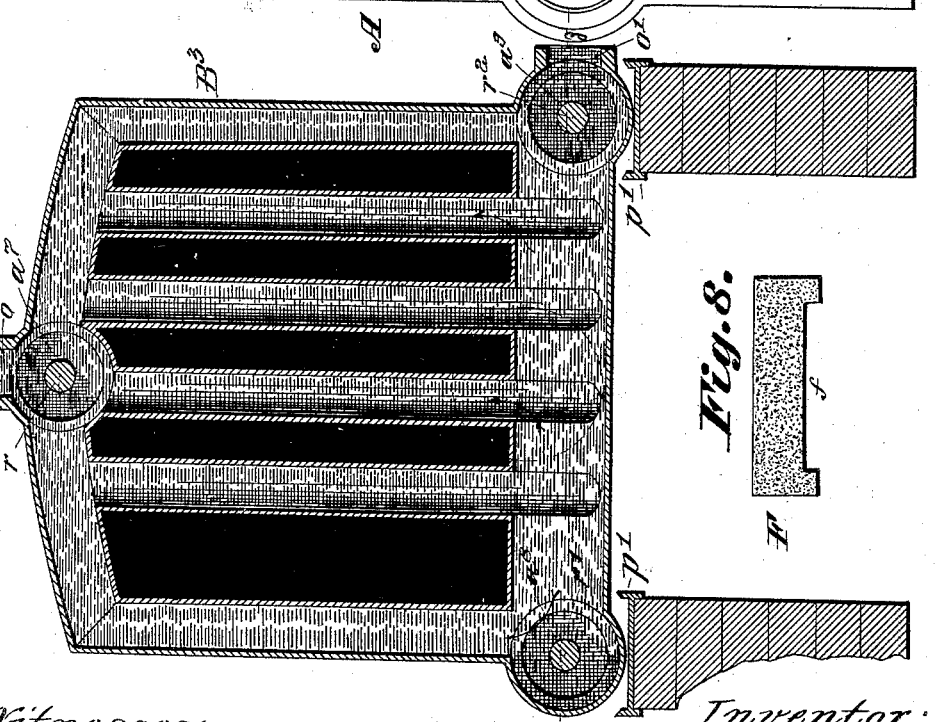 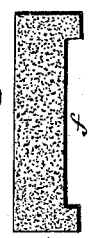

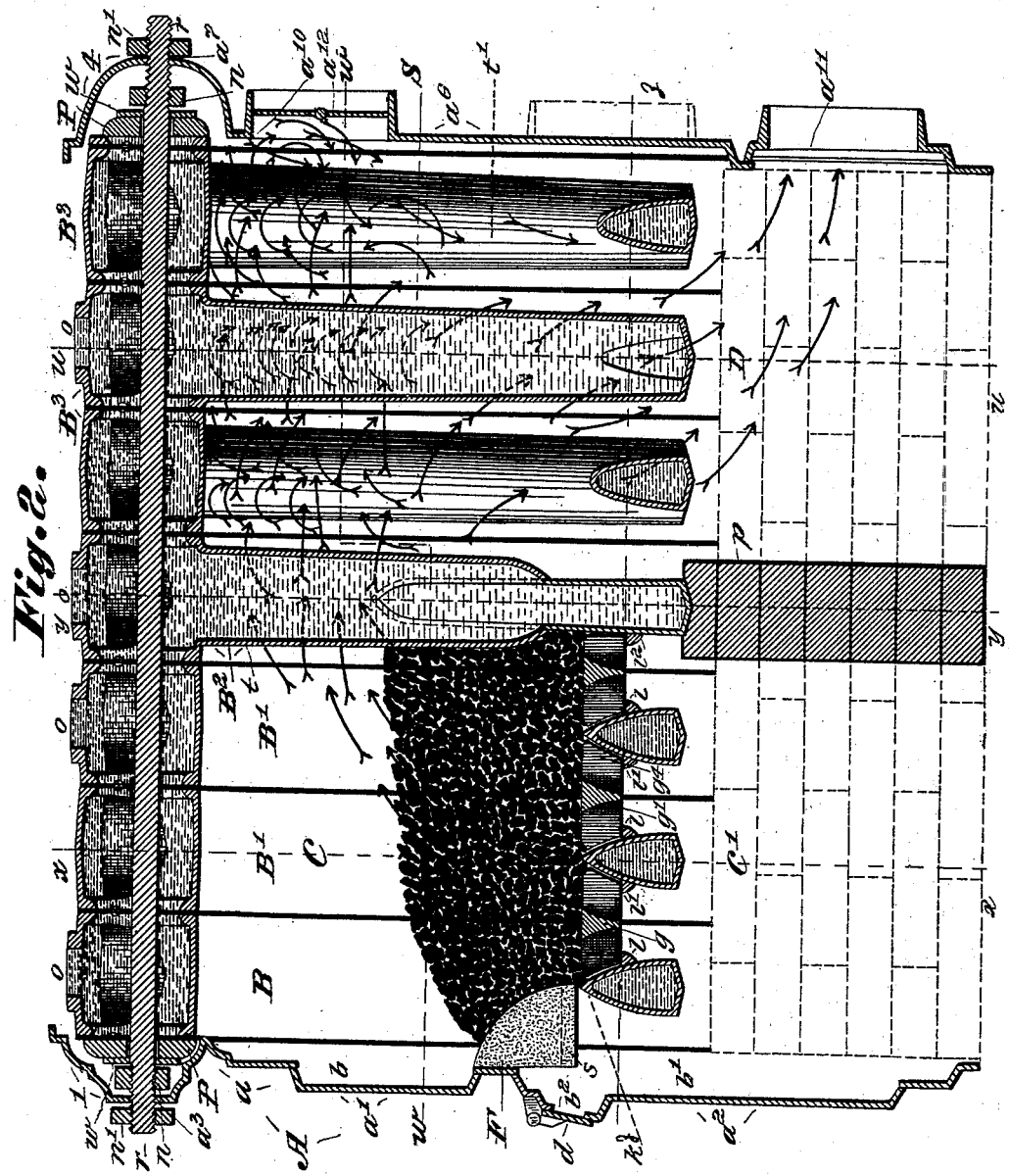

(No Model.)  5 Sheets—Sheet 3.
N. A. BOYNTON.
HOT WATER HEATING APPARATUS.
No. 396,802. Patented Jan. 29, 1889.
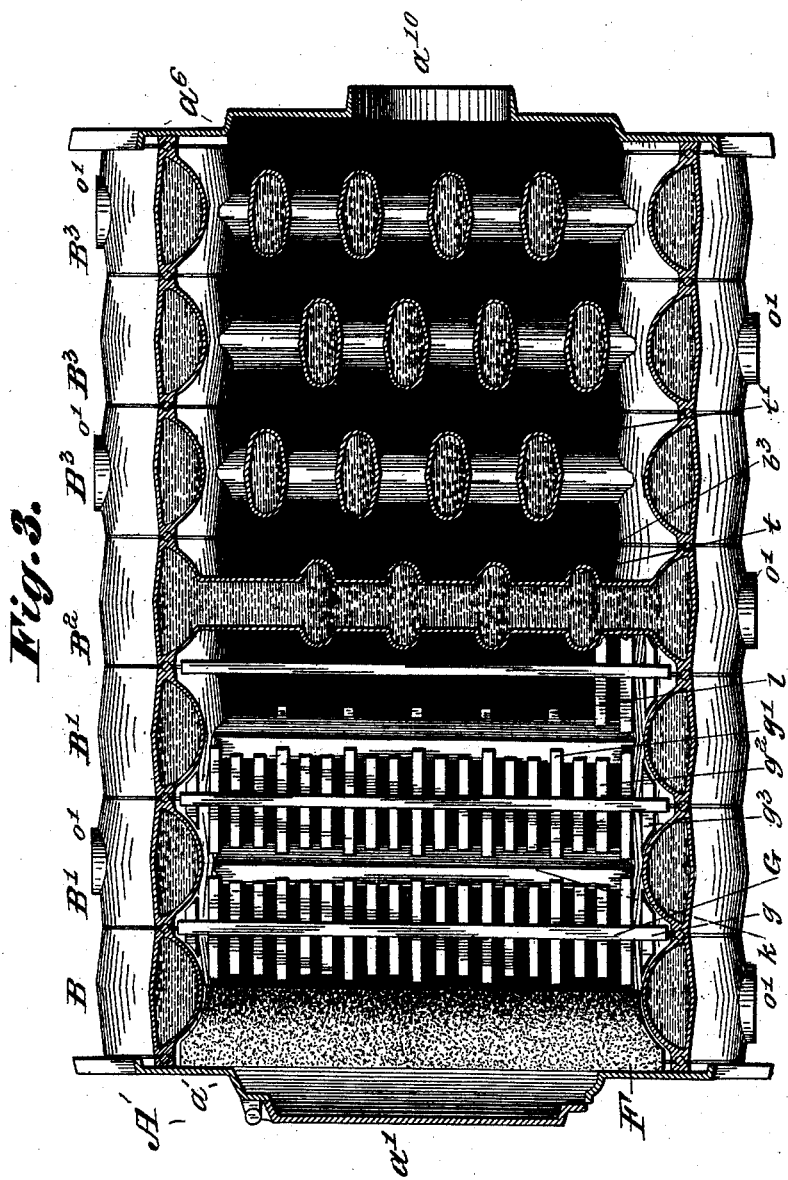
Witnesses:
Arthur Ashley
James F. DuHamel
Inventor:
Nathaniel A. Boynton
per J. H. Ashley atty.

(No Model.) 5 Sheets—Sheet 4.
N. A. BOYNTON.
HOT WATER HEATING APPARATUS.
No. 396,802. Patented Jan. 29, 1889.
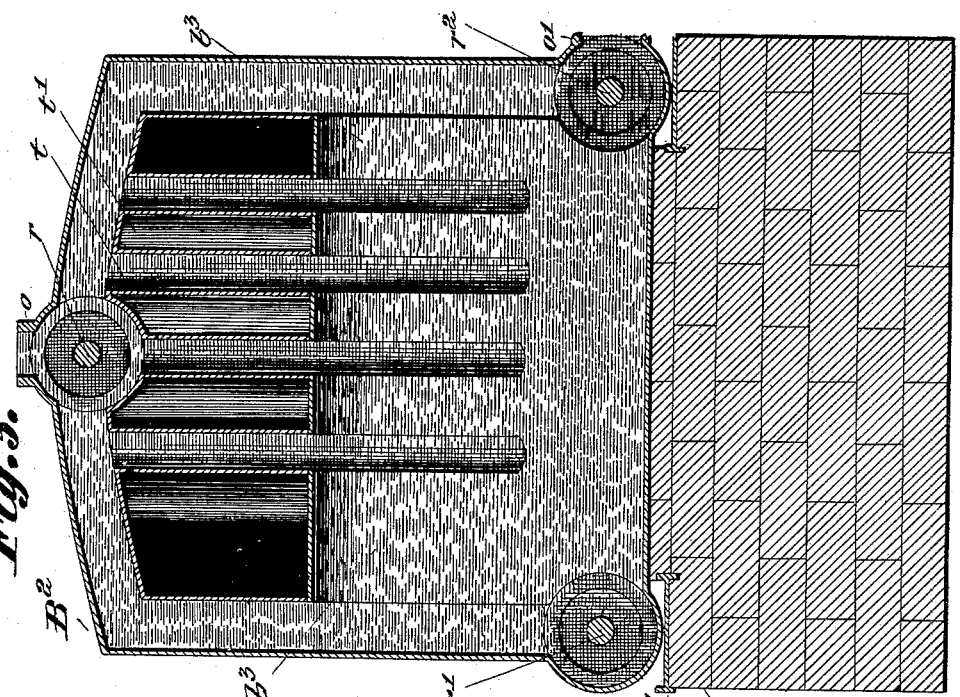
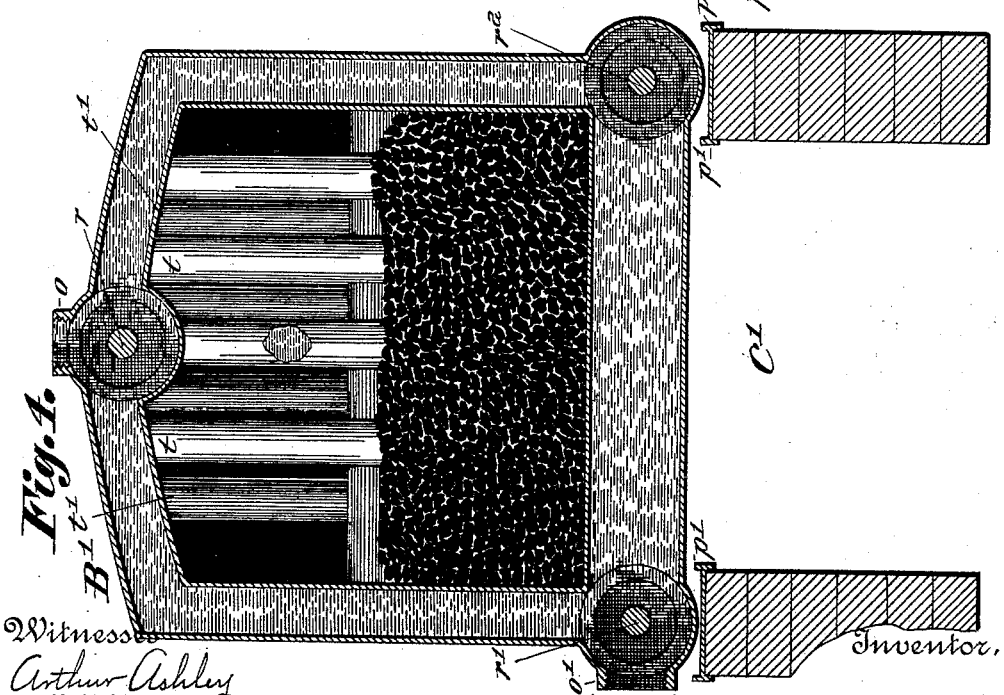
Witnesses
Arthur Ashley
James F. DuHamel
Inventor
Nathaniel A. Boynton
By J. A. Ashley atty.

(No Model.)  N. A. BOYNTON.  5 Sheets—Sheet 5.
HOT WATER HEATING APPARATUS.
No. 396,802.  Patented Jan. 29, 1889.

Witnesses:
Arthur Ashley
James F. DuHamel

Inventor:
Nathaniel A. Boynton
per J. A. Ashley atty.

UNITED STATES PATENT OFFICE.

NATHANIEL A. BOYNTON, OF NEW YORK, N. Y., ASSIGNOR TO THE BOYNTON FURNACE COMPANY, OF SAME PLACE.

HOT-WATER HEATING APPARATUS.

SPECIFICATION forming part of Letters Patent No. 396,802, dated January 29, 1889.

Application filed October 31, 1888. Serial No. 289,617. (No model.)

*To all whom it may concern:*

Be it known that I, NATHANIEL A. BOYNTON, a citizen of the United States, residing in the city of New York, in the county of New York, in the State of New York, have invented a new and useful Hot-Water Heating Apparatus, of which the following is a description.

The invention has relation to that class of water heating and circulating boilers which are designed mainly for warming dwelling-houses and other buildings, through radiation of heat from pipes and chambers which contain the circulating fluid.

The invention consists in certain novel parts, and in certain novel combinations of parts in a water heating and circulating apparatus, whereby the currents of water are continuously circulated and are repeatedly subjected to the action of the currents of smoke and other volatile products of combustion, whereby the volatile products of combustion are retained within the combustion-chamber until the heat thereof shall have been fully absorbed and utilized, whereby the walls of certain of the water-circulating chambers or sections are adapted to serve as supports for the sections of the fuel-grate, and whereby the appliances by which the water containing and circulating sections are secured together are employed also in securing to such circulating-water sections the vertical closing-plates which constitute the end sections of the heater.

In the drawings, Figure 1 represents a front elevation of the heater. Fig. 2 represents a vertical longitudinal central section, as on the line $v\,v$ of Fig. 1. Fig. 3 represents a top plan view in horizontal section on the irregular line $w\,w$ in Fig. 2. Fig. 4 represents a transverse vertical section on the line $x\,x$ in Fig. 2. Fig. 5 represents a transverse vertical section on the line $y\,y$ in Fig. 2. Fig. 6 represents a top plan view in horizontal section on the line $z\,z$ in Figs. 2 and 7. Fig. 7 represents a transverse vertical section on the line $u\,u$ in Fig. 2. Fig. 8 represents an elevation of the recessed fire-brick lining, the figure being drawn to a reduced scale.

From the several figures in the drawings it will be seen that the water heating and circulating apparatus is composed essentially of a series of vertically-placed transversely-extending water-sections which inclose the sides of the fuel-chamber and of the smoke chamber or flue-space, a front closing-plate or end section which forms the front wall of the fuel-chamber, and a rear closing-plate which constitutes the rear wall of the smoke-chamber.

As will be seen in Figs. 1 and 2, the front plate or end section, $a$, of the heater A has an upper opening, $b$, for supplying fuel, provided with a door, $a'$, and a lower opening, $b'$, for access to the ash-pit $C'$, and which is provided with a door, $a^2$, which closes the ash-pit space, and also covers the slicing-opening $s$. This lower door, $a^2$, is in turn provided with an opening, $b^2$, which is covered by a drop-door, $d$, (best seen in Fig. 2,) which when lifted affords access to the passage $s$ and obviates the necessity of unclosing the main door $a^2$ when it is desired to "slice" the fire. In its center at its upper extremity this front plate or end section, $a$, has a perforation, $a^3$, and at its sides, in a plane with the lower horizontal portions of the water-sections, it has openings $a^4\,a^5$ to receive, respectively, the longitudinal securing-rods $r$, $r'$, and $r^2$. The rear closing-plate or end section $a^6$ is provided with perforations or openings, $a^7\,a^8$, and $a^9$, which are coincident with the openings $a^3$, $a^4$, and $a^5$, in the front casing or end section $a$; and it is provided also with an upper direct smoke-exit opening, $a^{10}$, and with a lower indirect smoke-exit opening, $a^{11}$, each of such exit-openings being provided with a pipe-collar, in the ordinary manner, and the opening $a^{10}$ being provided with a damper, $a^{12}$.

It will be observed that the perforations $a^3\,a^4\,a^5$ in the front plate or end section and the perforations $a^7\,a^8\,a^9$ in the rear end section or closing-plate are formed in hollow outwardly-rounded protuberances or bosses 1 2 3 4 5 6, respectively, the cavity formed in the interior of each of which receives a centrally-perforated covering and securing plate, P, which closes the open end of the water-section, a washer, $w$, and a holding-nut, $n$, which latter engages the threaded portion of one of the longitudinal securing-rods $r$, $r'$, or $r^2$ and rigidly clamps together the series of intermediate water-sections, B B' B' B² B³ B³ B³. These water-sections are of substantially equal thickness, and by preference each alternate one has a screw-threaded opening, o, at its upper extremity to adapt it to receive a water-discharging pipe, (not shown,) and each has or may have at one side at a point corresponding with its longitudinal water-passage a similar opening, o', to receive a water-inlet pipe. Any desired suitable number of these water-sections may be employed, the sides of the same which have inflow-openings being arranged, in assembling, in alternation with the sides which have no openings, as will be best seen in the sectional plan views represented in Figs. 3 and 6.

The combustion-chamber water-sections B, B', and B', have transverse, horizontal, top, and bottom passages and right and left vertical passages, as seen in Figs. 4 and 6, the lower horizontal passages communicating with the longitudinal side passages, which are formed in the outwardly-rounded portions at the lower extremity of the sections, and the upper transverse portions and passages connecting with the central longitudinal passage formed in the similarly outwardly-rounded portion of the upper extremity of the sections. The section B has on its rear face a ledge, $l$, and the sections B' B' have each a front ledge, $l'$, and a rear ledge, $l$, for the support of grate-sections G.

The bridge-wall section $B^2$, between the combustion-chamber C and the smoke-chamber S, rests upon a division-wall, $p$, which in the drawings, Fig. 2, is represented as composed of brick masonry, but which, as is obvious, may be of other material. This division-wall or pier $p$ serves to separate the ash-pit C' from the corresponding smoke-chamber or diving-flue space D behind it. As is seen in the longitudinal section shown in Fig. 2, in the sectional plan shown in Fig. 3, and in the transverse vertical section represented in Fig. 5, this section is provided with intermediate vertical water-tubes, $t\ t\ t\ t$, which communicate at top and bottom with the upper and lower transverse passages of the section, such tranverse passages communicating in turn with the central longitudinal passage at the top and with the side longitudinal passages at the bottom of the section, the web-like bridge-wall portions $b^3$ being re-enforced and strengthened at front and rear by the bracing action of the diminished portions of the water-tubes at their point of junction. Upon the front of its lower transverse portion this bridge-wall section $B^2$ has a grate-supporting ledge, $l^2$, which corresponds with the rear ledge, $l$, upon the contiguous fuel-chamber water-section B'.

The several supporting-ledges need not be, and, by preference, will not be, continuous, but will be formed only at points coincident with the long cross-bars $g'$ of the grate-sections, the intermediate portions of the supporting water-tubes being made plain to insure precipitation into the space below of any ashes that may fall thereon.

As will be seen in the plan view, Fig. 3, the grate-sections are tapered and inwardly curved at their ends to correspond with the outward curvature of the inner surface of the sections B, B', B', and $B^2$, thereby retaining the fuel while providing an interspace for clearance of ashes.

The upper surface of the grate-sections might be in a plane considerably higher than the upper extremity of the supporting parts of the water-sections without departing from the principle of the construction already described; but in most cases it will be found that most thorough utilization of the heat by the water in the passages will be effected under the construction which I have represented.

The smoke and combustion chamber sections $B^3\ B^3\ B^3$ are alike in their construction; but they are faced alternately to the left and to the right in assembling, so that the intermediate vertical tubes, $t'\ t'\ t'\ t'$, may be non-coincident with the like series of tubes upon the contiguous section, and so that zigzag smoke-passages will be produced, as best represented in Figs. 2 and 3. As will be understood, the flattened or transversely-oval tubes $t$ of the sections $B^3$ communicate at top and bottom with transverse portions of the section in the manner already explained in describing the bridge-wall section $B^2$.

The grate-sections G, each having longitudinal main bar $g$, long transverse undercut bars $g'$, short intermediate transverse bars, $g^2$, and end transverse bars, $g^3$, are supported upon the ledges $l$, $l'$, and $l^2$ of the lower transverse portions of the sections B, B', and $B^2$, as already indicated. The long transverse bars $g'$ are undercut at their outer ends to form an overhang, $g^4$, the bottom portion or surface of which is curved, as seen, to correspond with the curved upper portion of the transverse lower part of the water-section, sufficient space being left between the two parts to permit upward passage of air and downward escape of ashes as they are dislodged from the grate and from the water-sections. It will be noted that the lower transverse portion of each of the three members B B' B' of the water-sections terminates upwardly in a narrow spine or knife-edge, $k$, the sharpness of which prevents lodgment of ashes upon the upper extremity of these water-passages.

The fire-brick lining F at the front of the combustion and fuel chamber C has a recess, $f$, along the main portion of its bottom surface, as indicated in the detached view represented in Fig. 8 and in the dotted line seen in Fig. 2, to provide a passage coincident with the drop-door $d$, to permit the insertion into the lower portion of the contents of the fuel-chamber, directly above the surface of the grate-sections and of the edges, $k$, of a suitable implement for "slicing" the fire.

As will have been observed, the longitudinal securing-rods $r$, $r'$, and $r^2$ receive at their ends an exterior holding-nut, $n'$, which fits closely upon the flattened outer portion of the outwardly-rounded protuberances or bosses 1 2 3 4 5 6, and secures the front and rear plates or end sections rigidly to the intermediate transversely-extending water-sections.

As is apparent from the drawings, the several water-sections are each cast complete in a single piece. In assembling the parts the joints are rendered water-tight by means of asbestos or other suitable packing, and each section may rest on a bed-plate, $p'$.

If desired, the centrally-perforated covering cap or plate P may be cast integrally with its water-section; but in most cases it will be found advantageous to form it separately for subsequent attachment.

The side walls covering the ash-pit and the rear base or diving-flue may be either of brick, as indicated in Fig. 2, or of other suitable material.

In operation, a fire being kindled upon the grate-sections, the damper which controls the direct exit-opening $a^{10}$ is left unclosed until the combustion has reached the desired degree of intensity. The damper being thereupon closed, the products of combustion will be restricted in their escape and will have an eddying and revolving movement among the vertical water-tubes $t$ and $t'$, impinging again and again upon the transverse upper portions of the water-sections and upon the rear end section or closing-plate, the escaping products parting continually with their caloric until the greater portion thereof has been absorbed by and conveyed away in the currents of water. As the temperature of the products is thus by slow degrees reduced, they will gradually descend, finding their way through the intervals between the lower transverse portions of the water-sections and through the interval between the rearmost water-section and the rear exterior closing-plate into the diving-flue space D, from which they will gradually find escape through the indirect exit-opening $a^{11}$. Particles of ashes or other residuum of the fuel, which may have been carried by the draft into this smoke-chamber, will fall between the lower transverse portions of these rear water-sections and will be deposited upon the bottom of the diving-flue space D, whence through suitable openings in the side or rear walls of such space they may be removed at convenience.

As the right and left passages and the vertical passages of the various water-sections all communicate with the longitudinal passages at the sides and with the longitudinal passage at the top of the structure, it will be apparent that circulation transversely, longitudinally, and upwardly will be free and unrestricted throughout the entire interior space of all the sections, and that water which is discharged at the top openings of the sections may be received either by a pipe which leads to an upper apartment and thence to one of the side openings in such section, or by a shorter pipe which leads directly to such side opening, in order that its contents may be additionally heated.

If some of the openings in the upper longitudinal water-passage be supplied with closing-plugs instead of with water-pipes, the circulation of the water within the sections will only be accelerated by such means of restriction.

It will be apparent that the advantages of the described smoke and gas chamber S, closed on all sides when the apparatus is being actively operated and open only for downward escape of the products of combustion, will be available, although in a somewhat diminished degree, if a single exit-opening only, at about the mid-height of the rear closing-plate or end section, be provided, as indicated by dotted lines in Figs. 2 and 7.

In situations in which the application of a high degree of heat to the water-sections is necessary it may be found desirable to employ exterior instead of interior straining or clamping rods; but ordinarily the arrangement shown will be found most convenient and advantageous.

Having described my invention, I claim—

1. A hot-water heating apparatus which is composed, essentially, of transversely-placed intercommunicating water-sections, each of which has vertical side passages, transverse horizontal top and bottom passages, and longitudinal top and bottom passages, the longitudinal top passages being in plane with the transverse horizontal top passages and the longitudinal bottom passages being in plane with the transverse horizontal bottom passages, a front closing-plate or end section which has an opening for supplying fuel, and a rear closing-plate or end section which has a smoke-exit opening, substantially as set forth.

2. In a hot-water heating apparatus, the combination, with the combustion-chamber, the bottom transverse water-passages, and the transverse grate-sections, of the front plate or end section provided with the opening $b^2$ and door $d$, and the intermediate fire-brick lining having the recess $f$ coincident with the opening $b^2$ and with the upper surface of the transverse water-passages, and the corresponding grate-sections, substantially as and for the purposes described.

3. A hot-water heating apparatus the fuel-chamber of which has at its bottom transversely-placed water-tubes which connect with the side walls of the chamber, and which are provided upon their sides with longitudinal ledges for the support of the grate-sections of such fuel-chamber, such water-tubes and such grate-sections being arranged in alternation side by side, and constituting together the fuel-support of such heating apparatus.

4. In a hot-water heating apparatus, the combination, with the fuel-chamber thereof, of transverse water-circulating tubes, each of which has a curved upper surface and a longitudinal supporting-ledge, and grate-sections which are provided with transverse bars which have an end bottom-curved overhang which coincides with the curvature of the upper portion of the transversely-extending water-tubes.

5. In a hot-water heating apparatus, the combination, with the lateral walls of the combustion and fuel chamber thereof, of transversely-extending water-circulating tubes, and independent detachable transversely-extending grate-sections, the upper surface of which is in a plane with the upper extremity of the water-circulating tubes, whereby the grate-sections and the water-tubes each constitute a part of the fuel-bearing surface.

6. In a hot-water heating apparatus, a combustion-chamber the fuel-space of which is closed at its sides, at its top, and at its bottom by vertical water-sections which are placed in continuous contact, at the rear by a bridge-wall water-passage, and at the front by an exterior closing-plate and an interior fire-brick lining.

7. In a hot-water heating apparatus, the combination, with the water-sections B, B′ B′, and B², having inwardly-projecting curved vertical surfaces, of the grate-sections G, having tapered and inwardly-curved ends, substantially as and for the purposes set forth.

8. In a hot-water heating apparatus, a water-section which embraces top transverse water-passages, a top longitudinal water-passage, side vertical water-passages, a bottom horizontal water-passage which constitutes a bridge-wall, and vertical water-tubes which connect the top transverse water-passages with the transverse bridge-wall water-passage.

9. In a hot-water heating apparatus, the combination, with the water-sections B, B′ B′, and B², having projecting grate-supports, as described, of the cross-barred grate-sections G, adapted to such grate-supports, and the fire-brick lining F′, having the slicing recess or passage $f$, coincident with the upper surface of the grate-sections, substantially as and for the purpose described.

10. In a hot-water heating apparatus, the combination of a series of centrally-open combustion-chamber water-sections, a bridge-wall water-section, a series of smoke-chamber water-sections, each having side and intermediate vertical water tubes, and front and rear closing-plates or end sections, the several water-sections and closing-plates being connected together for operation, substantially as described.

11. In a hot-water heating apparatus, the combination of centrally-unobstructed combustion-chamber water-sections, a bridge-wall water-section and smoke-chamber water-sections, each of which is provided with intermediate vertical water-circulating tubes, each of which is non-coincident with the vertical tubes of the contiguous water-section, thereby forming zigzag smoke-flues, a front closing-plate or door-section, and a rear closing-plate which has an upper direct exit-opening and a lower indirect exit-opening which is in a plane below the lower extremity of the several water-sections, whereby, when the direct exit-opening is closed, the products of combustion are caused to pass first across the surfaces of the vertical water-tubes and then downwardly across the surfaces of the bottom horizontal tubes of the smoke-chamber water-sections, substantially as and for the purposes set forth.

12. The combination, in a hot-water heating apparatus, of front and rear closing-plates or end sections, each having perforations for a securing-rod, intermediate water-sections, each having vertical side passages, transverse and longitudinal horizontal bottom passages, a central longitudinal horizontal top passage, and transverse horizontal top passages which abut upon and discharge into the longitudinal top passage, and securing-rods which extend from end to end of the assembled longitudinal passages and through the perforations in the closing-plates or end sections.

13. In a hot-water heating apparatus, the combination, with a series of transversely-placed water-sections, each having transverse horizontal passages and each having longitudinal water-passages in a plane with and communicating directly with the transverse horizontal passages and with end sections or closing-plates having perforated bosses, as described, of longitudinal holding-rods which extend through the longitudinal water-passages and through the perforations, the securing-plate P, washer $w$, and nut $n$, inside the end sections, for clamping the water-sections, and the securing-nut $n'$, for clamping the closing-plates or end sections to the series of water-sections.

14. A hot-water heating apparatus which embraces a series of vertically and transversely placed water-sections, each of which has right and left vertical water-passages, a bottom transverse water-passage, bottom longitudinal water-passages, a top central longitudinal water-passage, and top transverse water-passages which open directly into the top central longitudinal water-passage, a front closing-plate which has openings for fuel-supply, fuel-agitation, and refuse-discharge, and a rear closing-plate which is provided with a smoke-exit opening, the parts being connected for operation, as described.

NATHANIEL A. BOYNTON.

Witnesses:
O. B. LEWIS,
A. GILBERT.